United States Patent [19]
Purrer

[11] 3,730,037
[45] May 1, 1973

[54] REVERSIBLE TRANSMISSION, ESPECIALLY FOR FIELD HARVESTERS

[75] Inventor: Josef Purrer, Gottamadingen, Germany

[73] Assignee: Maschinenfabrik Fahr A G, Gottmadingen, Germany

[22] Filed: Mar. 8, 1971

[21] Appl. No.: 121,939

[52] U.S. Cl. .................. 83/68, 74/203, 74/213, 241/186 R
[51] Int. Cl. ............................................... B26d 5/10
[58] Field of Search .................. 146/DIG. 3, 118; 74/203, 213; 83/68

[56] References Cited

UNITED STATES PATENTS

| | | | |
|---|---|---|---|
| 812,823 | 2/1906 | Clay | 74/203 |
| 2,780,107 | 2/1957 | Sorrell | 74/203 |
| 1,129,992 | 3/1915 | Klumb | 146/DIG. 3 |
| 2,670,630 | 3/1954 | Williams | 74/203 |
| 2,912,871 | 11/1959 | Velkoff | 74/203 |
| 3,202,144 | 8/1965 | Nicholson et al. | 74/203 X |

*Primary Examiner*—Willie G. Abercrombie
*Attorney*—Karl F. Ross

[57] ABSTRACT

A reversible transmission, especially for the pickup, feed and/or drums of a field harvester, in which a pair of fixed shafts from input and output members of the transmission and a further shaft is mounted upon a support swingable about the axis of one of the shafts. This intermediate or swingable shaft carries a V-belt pulley which may be connected with the V-belt pulley of the other fixed shaft when the intermediate shaft is urged away from the latter to tension the belt. A pair of friction wheels on this intermediate shaft and on the other shaft are brought into engagement when the intermediate shaft is swung in the other direction. The wheels of the intermediate shaft are connected operatively to a wheel of the first-mentioned shaft about which the support is swingable.

7 Claims, 5 Drawing Figures

Josef Pürrer
INVENTOR.

BY
Karl F. Ross
Attorney

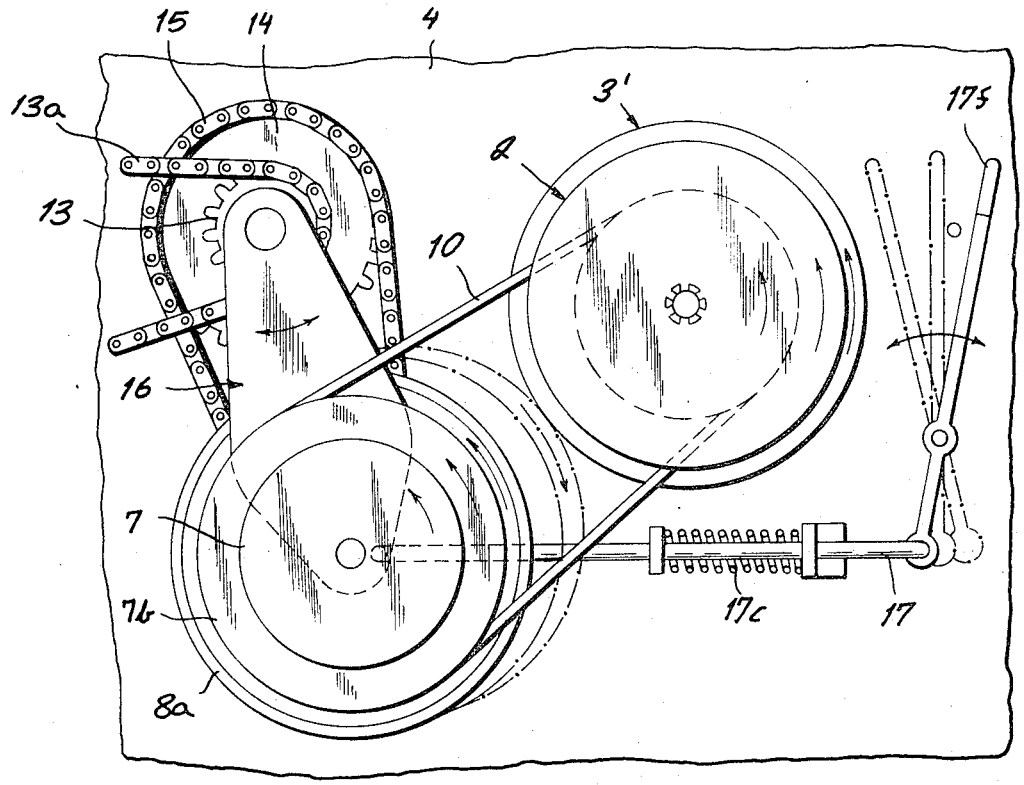
FIG. 3
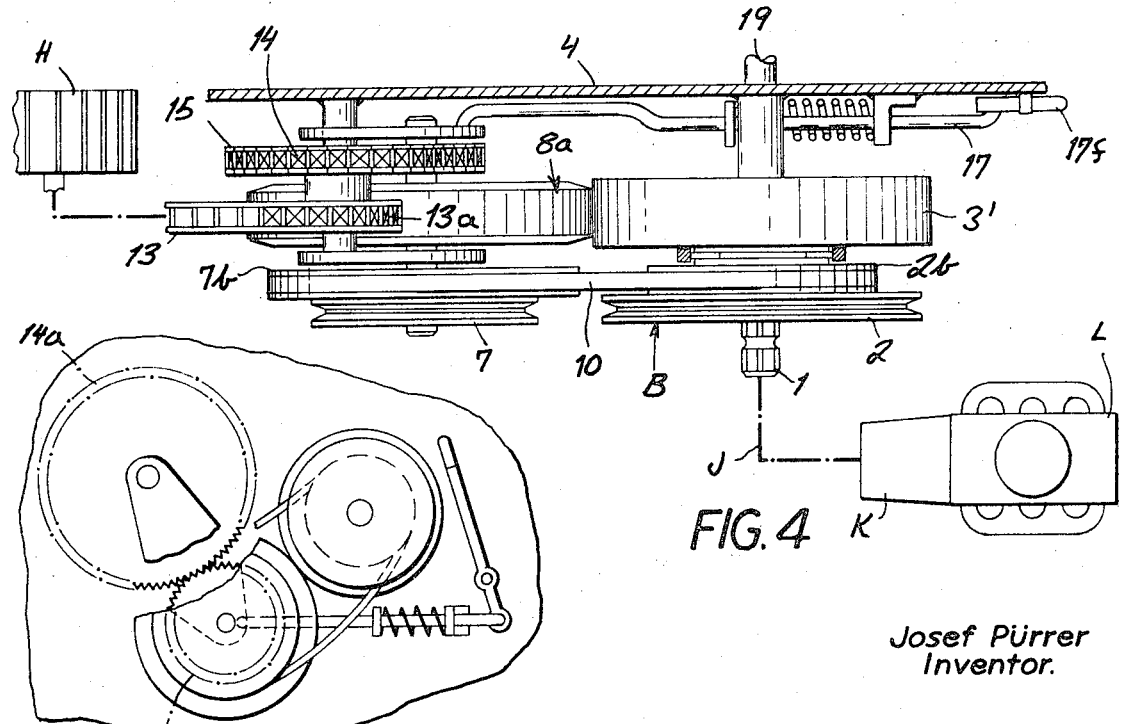
FIG. 4
FIG. 5
Josef Pürrer
Inventor.
By Karl F. Ross
Attorney

REVERSIBLE TRANSMISSION, ESPECIALLY FOR FIELD HARVESTERS

FIELD OF THE INVENTION

My present invention relates to a reversible transmission and, more particularly, to a reversible transmission for agricultural-machine feeds, especially the crop-transport mechanism of a field harvester.

BACKGROUND OF THE INVENTION

A field harvester generally comprises a crop-pickup mechanism adapted to lift a swathed crop from a windrow or a standing swath onto a transport mechanism, the crop being cut previously or being severed by blade means ahead of the feed mechanism. The crop-transport or feed mechanism then carries the crop material to a chopping drum in which a plurality of welds sever the crop material into relatively small portions which can be blown into a wagon or other receptacle. The resulting product may be used as silage or as fresh feed for cattle. In addition, such field harvesters may be provided with a feeding drum which accepts the crop material from the transport device and partially crushes it as it forces the crop material into the path of the blades of the cutting drum.

The crop-transport mechanism may consist of a single conveying device or a number of conveying devices, depending upon the direction in which the crop material is to be advanced for the nature of the crop pick-up. For example, it is a common practice to provide a pickup belt upon which the crop material is deposited and which moves in the direction of advance of the harvester to carry the crop material directly into the throat of a chopping chamber. In this case, the feed drum rotates about a horizontal axis perpendicular to the direction of travel of the machine and the crop material is advanced continuously rearwardly while the chopping drum or blade drum is rotatable about a similar horizontal axis perpendicular to the direction of travel but parallel to the axes of the conveyor belt rollers and the feed drum.

Alternatively, the axes of the feed drum and the weld drum may be horizontal but may run in the direction of travel of the machine. In this case, the belt conveyor may run transversely to the direction of travel and some other pickup device, e.g., a set of augers, screws, chains and the like may be used to deposit the crop material on the transversely moving conveyor belt. A system of this type is described in my commonly assigned copending application Ser. No. 114,329 filed Feb. 10, 1971, and entitled FIELD HARVESTER FOR ROW CROPS.

It should be understood that other variations of these structures have been proposed and, for example, the conveyor belt may move in the direction of travel of the machine and deposit its crop material upon a transversely moving conveyor, in the path of a conveyor worm, etc.

In all of the aforedescribed systems, it is essential from time to time to reverse the direction of movement of the crop-feed devices, e.g., as a safety measure or to permit clearing of the blades or feed drum. To this end relatively complex reversible transmissions have been proposed which use V-belts or the like. Such conventional devices have, however, the disadvantage that considerable force is necessary to switch over from a forward drive to a reverse drive. The system is excessively complex, and the belts which are subjected to excessive bending and frictional action on inner and outer surfaces, are prone to damage.

OBJECTS OF THE INVENTION

It is the general object of the present invention to provide an improved reversible drive adapted to obviate the disadvantages enumerated above.

A further object of this invention is to provide a reversible drive, especially for agricultural machines which is of low cost, simple construction and requires little force to effect a switchover from forward to reverse or vice versa, even under load.

It is another object of this invention to provide a reversing transmission for a crop-feed mechanism of a field harvesting machine which is of low cost, easy operation and requires a minimum of actuating force.

SUMMARY OF THE INVENTION

The above objects, and others which will become apparent hereinafter, are attained in accordance with the present invention in a system which comprises a spatially fixed input shaft and a housing swingably mounted on one of these shafts and defining an intermediate axis (which may be provided with an intermediate shaft) swingable toward and away from the other shaft.

A belt pulley on the other shaft is connected with a belt pulley rotatable about the intermediate axis by an endless belt or other endless member coupling same when the intermediate axis is in a position removed from the other shaft, the belt being detensioned when the intermediate shaft is moved into a position proximal to this other shaft. In the latter position, a friction wheel coaxial with the pulley of the swingable housing frictionally engages the friction wheel on the other shaft. The friction wheel and pulley of the housing are coupled operatively to the shaft about which they pivot or to a wheel thereon.

According to a more specific feature of this invention, the transmission comprises an intermediate wheel assembly which is keyed or fixed to an intermediate shaft carried by the swingable housing and in force-transmitting relationship, i.e., positively coupled with a wheel carried by the shaft about which the housing pivots or rotatable about the axis thereof, the latter shaft being spatially fixed and constituting the output shaft of the transmission.

According to an important feature of this invention, the drive wheel carried by the swingable housing is constituted as a friction wheel and as a pulley in interconnected relationship, the friction wheel and pulley being coaxial and jointly rotatable about the intermediate axis mentioned earlier. The friction wheel of the intermediate shaft is engageable with a friction wheel of the drive shaft in a position of the intermediate axis proximal to this drive shaft. At least one of these friction wheels is provided along its periphery with a rubber-like layer of a material having a high coefficient of sliding friction to limit slip between the wheels.

The drive shaft is provided, coaxially with the friction wheel, with a pulley which is connectable with the pulley of the intermediate shaft by an endless member, e.g., a belt which frictionally engages each of the pulleys. The pulleys which are interconnected by this belt may, moreover, be of the stepped-pulley type.

The connection between the wheels of the intermediate shaft and the output shaft, according to the invention, is of the positive or nonslip type. To this end, the intermediate axis may be provided with a gear or sprocket wheel and a corresponding gear or sprocket may be provided on the output shaft to mesh with the first-mentioned gear or to be connected therewith via a chain or other endless member capable of preventing slip. The input shaft may drive or be driven from the feed drum of the field harvester while the output shaft is connected to the conveyor devices feeding crop material to the chopping portion of the harvester.

According to still another feature of the invention, a mechanical actuating device is provided for swinging the housing of the intermediate shaft between its extreme positions, this mechanism including an indexing or stop device for retaining the housing in an intermediate position in which the belt and friction wheels are disengaged, this position corresponding to a neutral position of the system.

DESCRIPTION OF THE DRAWING

The above and other objects, features and advantages of the present invention will become more readily apparent from the following description, reference being made to the accompanying drawing in which:

FIG. 3 is a view similar to FIG. 1 illustrating another embodiment of the invention;

FIG. 4 is a view similar to FIG. 2 of the second embodiment; and

FIG. 5 is a diagrammatic view of another system according to the present invention.

SPECIFIC DESCRIPTION

Figure 1:
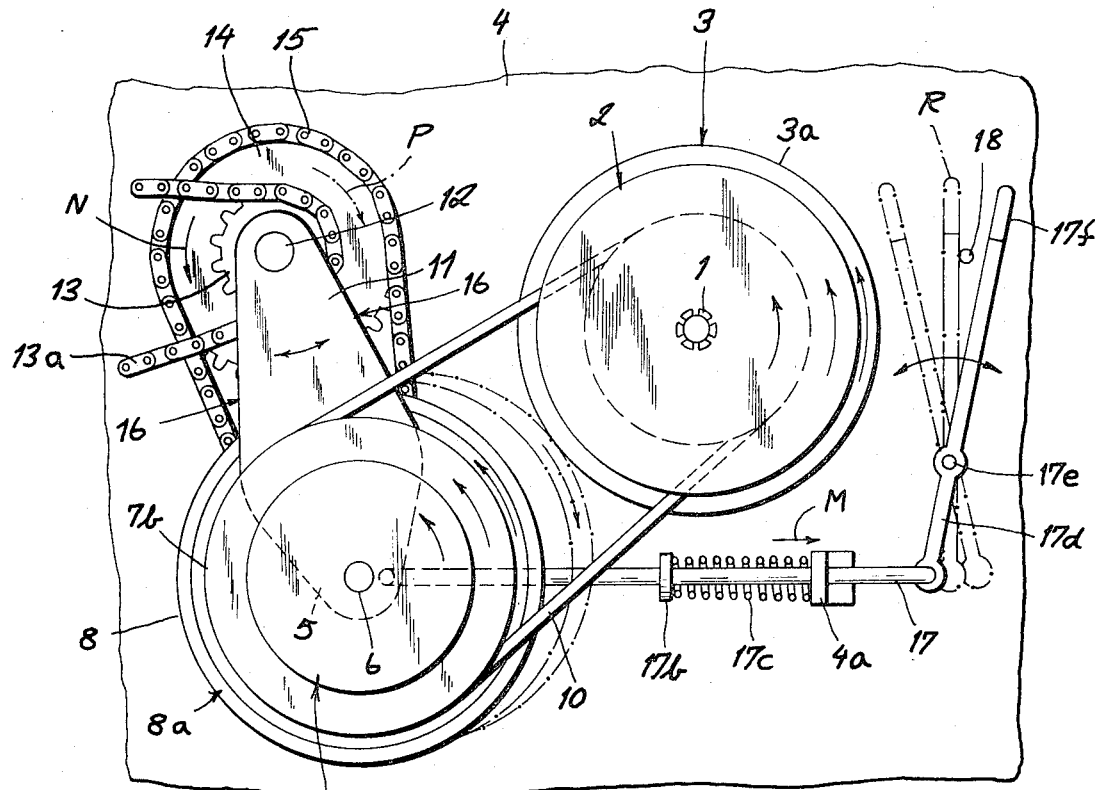
FIG. 1 is a vertical elevational view of a transmission according to the present invention.
Figure 2:
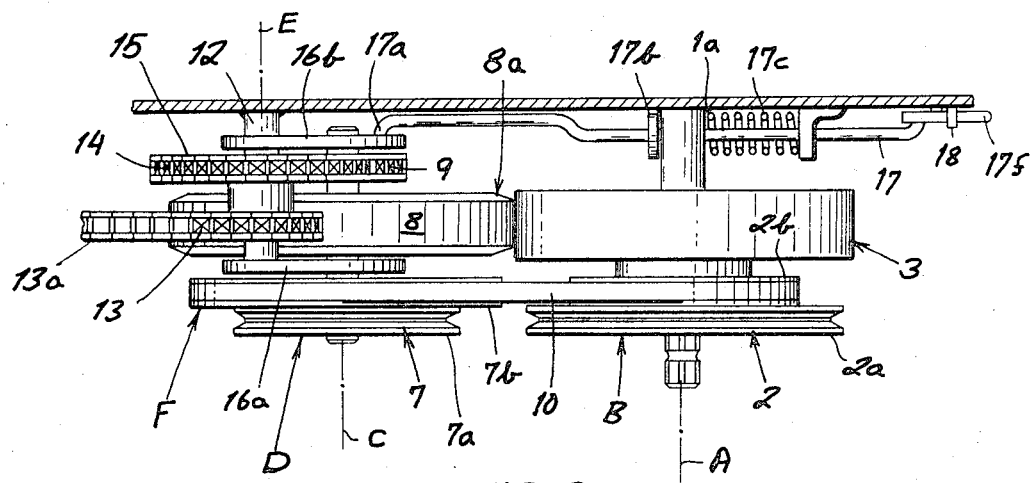
FIG. 2 is a cross-sectional view from the top of the transmission of FIG. 1.

In FIGS. 1 and 2, I show a transmission housing 4 forming the wall of a field harvester as described in the aforementioned copending application. The transmission comprises a drive shaft 1 which is mounted upon a fixed stud 1a on the housing 4 and devides a fixed axis A about which a first wheel system B is rotatable. This wheel system includes the shaft 1 which is splined to accept the power take-off shaft from the tractor drawing the field harvester as indicated in the copending application, a V-belt pulley 2 having a large diameter step 2a and a small diameter step 2b, and a friction wheel 3 whose surface 3a may be coated with a rubber-like material to reduce slip. The shaft 1 is, therefore, rotatable together with the pulleys 2a, 2b and the wheel 3, while being journaled on the housing 4 from one side.

The system also includes a swingable housing 16, defined by a pair of plates 16a and 16b, journaled on a fixed stud 12 and defining at its free end 5 an intermediate axis C along which the intermediate shaft 6 lies. The intermediate shaft 6 is journaled in the housing and carries a wheel system D including a stepped V-belt pulley 7 which is keyed to the shaft 6. The pulley 7 includes a small-diameter step 7a and a larger diameter step 7b which, in FIGS. 1 and 2, is shown to be engaged by the V-belt 10. The intermediate wheel assembly also includes a friction wheel 8a which is keyed to the shaft 6 and is provided along its periphery with a rubber-like layer 8, of a material designed to reduce the tendency to slippage. As shown in broken lines in FIG. 1, the wheel 8, 8a can be brought into frictional engagement with the wheel 3 when reversal of the drive is required.

Furthermore, the wheel assembly D includes a sprocket wheel 9 keyed to the shaft 6 and connected by a chain 15 to the sprocket wheel 14 journaled on the fixed stud 12 for rotation about the fixed axis E. The sprocket wheel 14 forms one member of another wheel assembly represented at F and including a sprocket 13 which is connected by a chain 13a to the driven member of the field harvester, e.g., the crop-feed device as represented at H in FIG. 3. The power take-off shaft J is connected from the tractor transmission K to shaft 1 and the transmission K is in turn driven by the internal combustion engine as represented at L in FIG. 4.

The system of FIGS. 1 and 2 is actuated by a rod 17 which is pivotally connected at 17a to the inner plate 16b of the housing and is provided with a shoulder 17b against which a captive spring 17c bears. The rod 17 is slidable in a flange 4a of the housing which defines another seat for the spring 17c. Consequently, the spring 17c resists displacement of the rod 17 in the direction of arrow M and tends to retain the housing 16 in its extreme clockwise position (FIG. 1) and tensions the belt 10.

An actuating lever 17d is fulcrumed at 17e on the housing 4 and has a handle 17f which may be gripped by the operator. At its lower end, the lever 17d is articulated to the rod 17. Rotation of the lever 17f in the counterclockwise sense, shifts the rod 17 to the right against the force of spring 17e and draws the periphery 8 of the friction wheel 8a into engagement with friction wheel 3 while slackening the belt 10. The output wheel 13, 14, previously driven in the counterclockwise direction N, is then driven in the clockwise direction P. In the intermediate position R of the lever 17d, the belt 10 is slackened but wheel 8, 8a, does not yet engage wheel 3 and the transmission is in a neutral position. A pin 18 may be inserted to retain the lever 17d in the neutral position as may be required.

To permit the transmission to operate in the preferred mode, the pin 18 is withdrawn to allow the spring 17c to shift the lever 17d in the clockwise direction and simultaneously tension the belt 10. If it is assumed that the wheel assembly B is rotated in the counterclockwise sense, the wheel assembly B will be similarly driven, thereby rotating sprockets 13 and 14 in the counterclockwise sense and driving the crop-feed device to advance the crop material to the chopper. When an overload requires reversal of the conveyor, the lever 17b is swung in the counterclockwise direction to draw the wheel 8, 8a against wheel 3, thereby compressing the spring 17c. In this position, continued rotation of the wheel assembly B in the counterclockwise sense results in a clockwise rotation of the sprockets 13 and 14 to reverse the direction of movement of the conveyor. In the intermediate position R of the lever, the conveyor decoupled from the input shaft 1 etc.

In FIGS. 3 and 4, a similar structure has been illustrated except that the wheel 3' and the entire assembly B is connected with the shaft 19 which runs to the feed drum or blade drum of the chopper. In this system, these drums may be driven from the input at shaft 1 or, if driven by some other source, will constitute the input to the transmission.

In FIG. 5 I have shown a modification of the systems of FIGS. 1 – 4 wherein the sprocket wheel 14 is replaced by a gear 14a which meshes with the gear 9a on the intermediate shaft. Otherwise the system operates in the manner already described.

The improvement described and illustrated is believed to admit of many modifications within the ability of persons skilled in the art, all such modifications being considered within the spirit and scope of the invention except as limited by the appended claims.

I claim:

1. A field harvester comprising:
   a housing, a chopping-blade drum journaled in said housing, a crop-feed conveyor for advancing crop to said drum, a drive, and a transmission connecting said drive to said conveyor and said drum, said transmission including:
      a first wheel assembly rotatable about a first axis fixed relative to said housing and operatively connected to said conveyor ;
      a second wheel assembly rotatable about a second axis fixed relative to said housing and connected to said drum, said second axis being spaced from but parallel to said first axis, said second wheel assembly forming the input to the transmission and said first wheel assembly forming the output thereof;
      a support swingable about said first axis;
      a third wheel assembly rotatable on said support about a third axis parallel to said first and second axes and shiftable toward and away from said second axis, said second and intermediate wheel assemblies being provided with frictionally engageable members for driving said intermediate wheel assembly in one direction when said intermediate axis is removed from said second axis and in the opposite direction when said intermediate axis is proximal to said second axis, said first wheel assembly and said intermediate wheel assembly being positively connected for joint rotation;
   means connecting said second wheel assembly to said drive; and
   actuating means for pivoting said support, thereby displacing said intermediate axis selectively toward and away from said second axis, said intermediate wheel assembly including:
      a toothed wheel coupled with said first wheel assembly,
      a friction wheel coaxial with and connected to said toothed wheel; and
      a pulley connected with said toothed wheel, said second wheel assembly comprising:
         a friction wheel engageable by the friction wheel of said intermediate wheel assembly in a position of said intermediate axis proximal to said second axis; and
         a pulley connected with the friction wheel of said second assembly, said members including a belt frictionally interconnecting said pulleys in a position of said intermediate axis remote from said second axis.

2. The transmission defined in claim 1 wherein said intermediate wheel assembly includes a toothed wheel coupled with said first wheel assembly, and a friction wheel coaxial with and connected to said toothed wheel, said second wheel assembly comprising a friction wheel engageable by the friction wheel of said intermediate wheel assembly in a position of said intermediate axis proximal to said second axis.

3. The transmission defined in claim 1 wherein at least one of said friction wheels is provided with a rubber-like layer along its periphery for limiting slip between said friction wheels.

4. The transmission defined in claim 1 wherein each of said pulleys is a stepped pulley.

5. The transmission defined in claim 1, further comprising a chain interconnecting said toothed wheels.

6. The transmission defined in claim 1 wherein said toothed wheels mesh with one another.

7. The transmission defined in claim 1 wherein said actuating means comprises a rod connected with said support, spring means bearing upon said rod in a direction tending to tension said belt for maintaining said transmission in a preferred operating mode, a lever connected with said rod for displacing same against the force of said spring means, and indexing means for retaining said actuating means in a position wherein said belt is slackened but said friction wheels are out of engagement.

* * * * *